Figure 1:
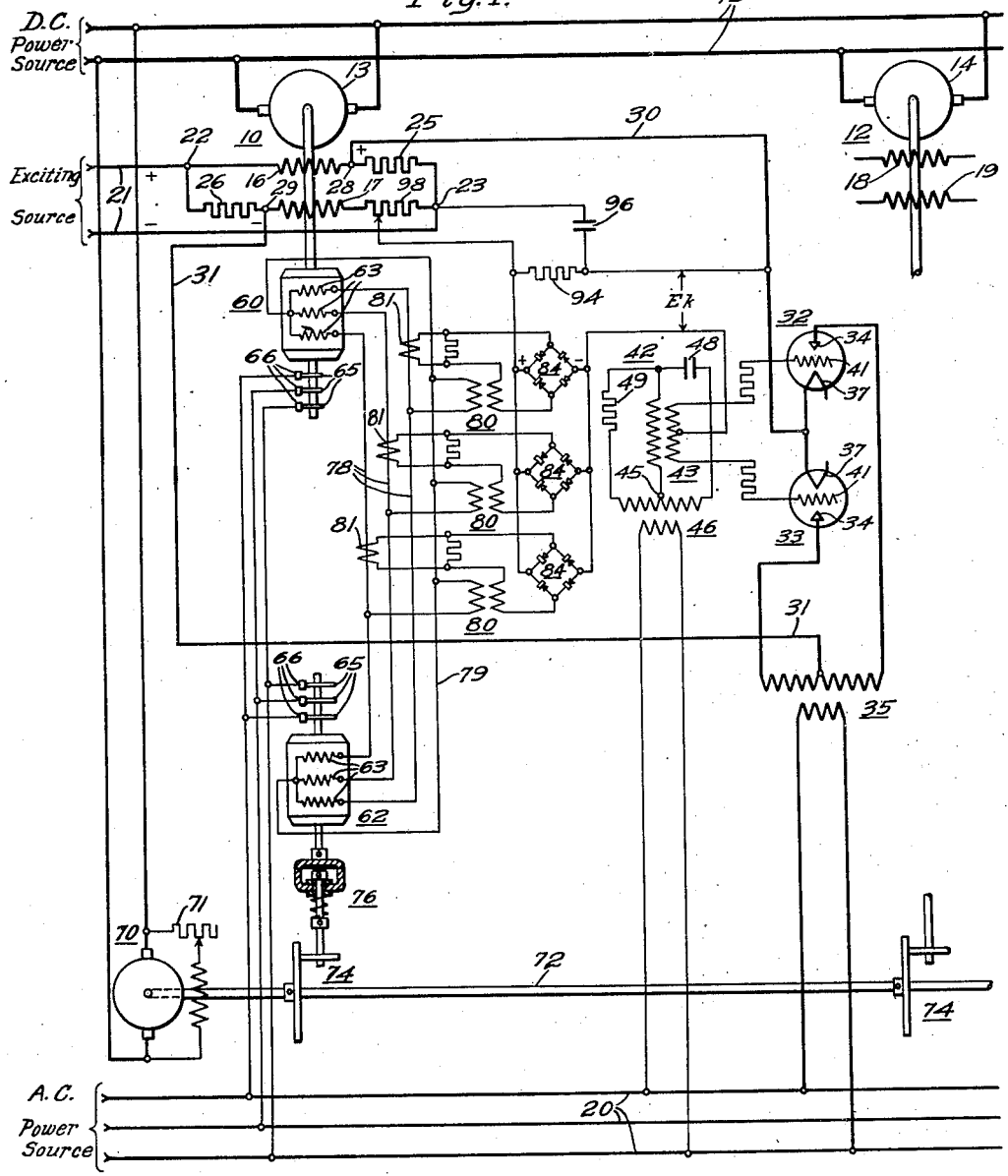

July 31, 1934.  S. A. STAEGE  1,968,575

REGULATING SYSTEM

Filed Nov. 25, 1933

WITNESSES:

INVENTOR
Stephen A. Staege.
BY
ATTORNEY

Patented July 31, 1934

1,968,575

UNITED STATES PATENT OFFICE 1,968,575

REGULATING SYSTEM

Stephen A. Staege, Pittsburgh, Pa., assignor to Westinghouse Electric & Manufacturing Company, East Pittsburgh, Pa., a corporation of Pennsylvania Application November 25, 1933, Serial No. 699,752

6 Claims. (Cl. 172—293)

My invention relates to regulating systems and it has particular relation to improvements in speed matching system adapted to maintain the speeds of a plurality of rotating machines in a predetermined relationship.

In certain applications where a plurality of separate driving motors are utilized to propel different portions of a common equipment such, for example, as in sectional paper machines, steel mill and other sectional drives, it is essential that the speeds of the several motors be maintained in predetermined relation. In a copending application, Serial No. 699,750, filed Nov. 25, 1933, by J. F. Peters, H. W. Reding and myself, there is shown and described a regulating system especially adapted for service of this kind, which system causes each of the regulated motors to rotate at a speed which is in synchronous relation with the voltage of an alternating current speed setting machine or master circuit.

In that particular system, each of the regulated motors, which for the majority of applications are of the direct-current type, is provided with an electronic tube or other equivalent speed-adjusting means sensitive to changes in the current which circulates between a source of alternating-current pilot voltage, having a frequency proportional to the motor speed, and a source of master voltage, the frequency of which is proportional to the desired speed of the motor, with which master source the pilot source is suitably interconnected.

The present invention is directed to improvements in this basic system of speed regulation and it particularly contemplates simplification or improvement in the apparatus required to convert changes in the speed responsive current which circulates between the pilot and master voltage sources into changes in the adjustable conductivity of the speed adjusting electronic tubes or other equivalent devices associated with the regulated machine.

One object of the invention is to provide an improved form of regulating system in which the speed of each of the regulating machines is determined by the frequency of the output voltage of a master or speed setting source.

Another object of the invention is to provide, in a regulating system of the type under consideration, improved means for converting changes in the circulating current which flows between the interconnected pilot and master alternating current voltage sources into corresponding changes in the effective conductivity of the motor-speed adjusting devices.

A further object of the invention is to provide in a regulating system which utilizes in the capacity of the speed-adjusting means, controllable current-rectifying devices of the electronic tube or other equivalent type, means whereby changes in an alternating speed-error responsive current may act to adjust the effective conductivity of the rectifying devices without the use of auxiliary electronic tubes which heretofore have been required.

In practicing my invention, I provide, in the circuit which interconnects the pilot and master generators associated with each of the regulated machines, a current and voltage transformer the sum of the output voltage of which transformers constitute the control potential which is impressed upon the speed-adjusting means for the regulated machine. The component of this potential supplied by the voltage transformer is of a relatively fixed magnitude while the component supplied by the current transformer changes in magnitude and phase position in accordance with the speed-error-responsive circulating current. The summation potential made up of these two components thus continuously varies in magnitude as the pilot generator advances from the limiting position in the lagging direction with respect to the master generator to the limiting position in the leading direction.

This summation voltage is then rectified and introduced into the control circuit of the speed-adjusting electronic tube in such manner that it effects a shift or displacement of the axis of the control voltage impressed upon the tube grid with respect to the axis of the power voltage which influences the tube anode element and in this manner appropriately adjusts the tube conductivity.

Figure 2:
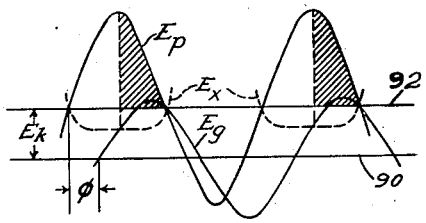

My invention itself, together with additional objects and advantages will best be understood from the following description of a specific embodiment thereof when taken in conjunction with the accompanying drawing, in which Figure 1 is a diagrammatic representation of apparatus and circuits comprised by a preferred form of my invention shown as being applied to a regulating system adapted to control the speeds of a plurality of direct-current motors, and Fig. 2 is a diagram of voltage waves illustrating the manner in which the improved control means of my invention act to adjust the conductivity of the speed control tubes associated with each regulated machine.

Referring to the drawing, the regulating system shown in Fig. 1, to which system the improved control means of my invention are illustrated as being applied, is essentially the same as that disclosed and claimed in the copending application beforementioned. Considering first a general description of this regulating system, two of the plurality of the direct-current motors whose speeds are to be regulated are illustrated at 10 and 12. These motors respectively comprise armature windings 13 and 14 which are suitably connected for energization from a source of direct-current power, illustrated in the form of circuit conductors 15, and field windings 16—17 and 18—19 which derive the controllable portion of their energization from rectified current supplied from an alternating-current power source designated by the conductors 20.

The provision of the two field windings for each of the regulated motors is for the purpose of reducing the magnitude of exciting current which must be supplied through the speed-control equipment and also to prevent over-speed of the motor in the event of failure of this equipment. As is more completely explained in the copending application referred to, these two field windings derive the major portion of their energization from a suitable source of constant potential direct-current power such as an exciting generator or the like. In the circuit shown, a circuit identified by conductors 21 constitutes this source and supplies current to diagonally opposite points 22 and 23 of an interconnection comprising the two field windings 16 and 17 and a pair of resistors 25 and 26.

Connected with the remaining diagonal points 28 and 29 in the interconnection are conductors 30 and 31 comprised by the output circuit of the speed control equipment which acts to change the motor excitation to thereby effect speed adjustment. As an examination of the diagram will reveal, when the polarities of the two supply sources are as indicated, current supplied through conductors 30 and 31 will oppose that which flows through the two windings 16 and 17 from the major energizing source 21 and will thereby effect a reduction of the excitation to control the motor speed.

In the regulating system illustrated, the speed of each of the regulated motors is compared through the utilization of a pilot alternating-current generator with that of a master alternating-current generator which is driven at a rate definitely related to the desired speed of the regulated motor. In the case of motor 10, this pilot generator is illustrated at 60 as being directly driven by the motor while the master generator which sets the speed at which the motor will be maintained is illustrated at 62. While, as shown, machines 60 and 62 are in the form of induction generators, which in mechanical construction may be similar to wound-rotor induction motors, it will be understood that they may also be of the well known synchronous or direct-current excited type.

As illustrated, each of these generators comprises three phase stator windings 63, and three phase rotor windings (not shown), the connections of which are brought out to slip rings 65. The machine rotor windings are shown as being excited from the three phase power source 20 by means of direct connections therewith established through brushes 66. The generators 60 and 62 are driven at speeds which are somewhat different from the synchronous values determined by the frequency of the exciting source 20 in order that there may be induced in the stator windings 63 voltages of a frequency suitable for the regulating service.

Each of the additional direct-current motors to be regulated is similarly provided with a pilot generator, comparable to machine 60 shown in association with motor 10, which cooperates with a master generator, comparable to machine 62, to control the motor speed-adjusting equipment, with a duplicate of that shown in association with motor 10 each of these additional motors is provided.

These several master generators are driven at predeterminedly related speeds by any suitable means illustrated in the drawing in the form of a direct current motor 70. As shown, this motor is energized from the direct current source 15 and is provided with a speed-changing rheostat 71. The motor drives, by means of a shaft 72, the master generators through speed changing mechanisms 74 which may be of any one of a number of well known types. Between each of the master generators and its driving means is disposed a slip clutch device shown in the case of generators 62 at 76. As is more completely explained in the copending application mentioned, the function of this device is to prevent the pilot and master generators from being pulled out of step in the event that the speed-deviation of the regulated motor becomes excessive, and in addition the device facilitates the starting of the regulated machines.

The output or stator winding 63 of the pilot and master generators are directly interconnected by means of circuit conductors 78. Each set of generating windings is illustrated as being star connected, the neutral points of which connections are joined by means of a conductor 79. When the output voltages of the two machines have a complete in-phase relation with respect to each other, the current flowing in conductors 78 will be substantially zero and will set up practically no synchronizing torque. However, as departure from this in-phase relation is made, there will be caused to circulate through circuit 78 a synchronizing current the magnitude of which is a direct function of the phase displacement. This current sets up, as before explained, the synchronizing torque which appears in the form of mechanical turning effort which must be transmitted by the generator driving shafts, in one of which is placed the slip clutch device 76 to restrict the driving torque below the pull-out value under all conditions.

Considering now the speed-adjusting apparatus illustrated in association with motor 10, this equipment comprises a pair of electronic tubes or other equivalent devices which act as controllable means for rectifying current delivered from the power source 20. These devices are shown at 32 and 33 as having anode elements 34 connected to opposite ends of the secondary winding of a transformer 35, the primary of which transformer is directly connected to supply conductors 20. The cathode elements 37 of the devices are joined together and connected through the conductor 30 to point 28 in the motor field winding interconnection, the diagonally opposite point 29 of which interconnection is jointed by means of conductor 31 to the midtap of the secondary winding of transformer 35.

Devices 32 and 33 are illustrated as grid controlled gas-filled tubes, each of which is capable of conducting current only from the anode to the cathode element. Thus, tube 32 will pass current during alternate half cycles of the voltage acting in transformer 35, while tube 33 will similarly pass current during the remaining half cycle, full wave rectification thus being effected by the combination.

The effective value of this rectified current supplied to the motor windings is controlled by changing the characteristics of the potential impressed upon the tube grid elements 41. If this potential is an alternating one having a frequency equal to that of the power source voltage impressed upon the tube anode elements, changes in phase displacement or a shifting of the axis of the potential wave with respect to that of the anode voltage wave will effect an adjustment of the effective conductivity of the tubes through a wide range. In the event that the displacement is of some constant value intermediate zero and 180°, as designated by $\theta$ in Fig. 2, in which figure the wave of anode voltage is designated by $E_p$ and the wave of grid control voltage by $E_g$, a shift of the axis 90 of this control voltage wave below the axis 92 of the anode or power source voltage wave $E_p$ will delay the institution of conduction by the tube to a later point in each positive half cycle, during the remainder of which it continues, and thus decreases the effective current passed by the tube. In a similar manner, a shift of the grid voltage axis in the opposite direction will progressively advance the conduction starting point with a resulting increase in effective tube conductivity. In connection with the showing of Fig. 2, it may be pointed out that this conduction starting point is determined by the intersection of the grid voltage wave $E_g$ with the wave of critical voltage $E_x$, which applies to one well-known design of electronic tube device.

To supply this grid control potential $E_g$, I provide a phase shifting bridge circuit 42 which comprises a grid influencing transformer 43 connected between the mid-point 45 of the secondary winding of a transformer 46 and a conductor joining a capacitor 48 with a resistor 49. The capacitor and resistor of the bridge circuit are connected in series for energization by the transformer 46, the primary winding of which transformer is energized from the alternating current circuit 20. The elements of the grid circuit are so proportioned that the amount of phase shift between the voltage of transformer 43 of the grid circuit and that of the supply circuit 20 is of some constant intermediate value designated by the beforementioned $\theta$ in Fig. 2.

In accordance with my invention, the effective conductivity of the speed-control tubes 32 and 33 is adjusted by shifting the axis 90 (Fig. 2) of the wave of grid voltage $E_g$ out of coincidence with the axis 92 of the wave of the anode voltage $E_p$, which shifting I accomplish by introducing between the cathode elements 37 of the tubes and the grid influencing transformer 43, a direct-current control voltage $E_k$ which is responsive to errors in the speed of the regulated motor 10. To produce this control voltage, the improved control means of my invention are utilized in the manner shown in Fig. 1.

In association with each phase of the circuit 78 which interconnects pilot generator 60 with master generator 62, I provide a potential or voltage transformer 80 and a current transformer 81, the combined output voltages of each set of which two transformers are impressed upon a rectifying device 84 which converts the alternating current summation potentials into the direct-current voltage $E_k$ for impression between the speed control tubes 32 and 33 and the grid influencing transformer 43. In the connection shown, the polarity of this rectified voltage $E_k$ is such that the axis 90 of the tube grid potential $E_g$ is displaced below that of the wave of anode potential $E_p$, as shown in Fig. 2, which figure has already been explained.

Each of the voltage transformers 80 is shown as being energized by the voltage appearing between one of the phase conductors of the interconnecting circuit 78 and the neutral conductor 79 associated with the two generators, while each of the current transformers 81 is acted upon by the current flowing in the conductor of circuit 78 with which the corresponding voltage transformer 80 is associated. As is known, when two alternators such as represented at 60 and 62 are interconnected in the manner shown, the synchronizing current which flows between them as a result of displacements between their internal voltages is substantially in phase with the voltage appearing at the alternator terminals for one direction of internal voltage displacement and substantially 180° out of phase with this voltage for the opposite direction of displacement. In the control means of my invention illustrated, this principle is utilized to effect the desired adjustments in the magnitude of the control potential $E_k$ as the phase displacement of generator 60 with respect to generator 62 advances from one limiting torque position through zero to the opposite limiting torque position.

Each of the voltage transformers 80 supplies to the input circuit of the associated rectifier 84 a voltage which is substantially constant regardless of the fluctuations in the phase position of the two generators 60 and 62. Each of the associated current transformers, however, supplies to the circuit, a variable voltage which preferably has a maximum magnitude somewhat less than the output voltage of transformer 80. When this current transformer voltage is maximum and in phase with that of transformer 80, the summation potential impressed upon each rectifier 84 will, of course, be maximum. As the magnitude of the current transformer voltage is reduced through zero and built up in the opposite or 180° displacement direction, this summation potential will be progressively reduced.

All of the three rectifiers 84 associated with the three phases of the generator interconnecting circuit are connected in parallel in the manner shown and function to supply a rectified voltage $E_k$ which is free from objectionably large alternating-current ripples, the advantage of utilizing all three of the phases being that the magnitude of these ripples is correspondingly reduced. It will be understood in this connection that the action of each of the sets of transformers associated with the different phases of circuit 78 is similar.

In operation of the complete regulating system illustrated in the drawing, at the desired speed of motor 10 the voltage of pilot generator 60 is substantially in phase with that of master generator 62, and the current which is caused to flow in circuit 78 is practically zero. The control potential $E_k$ supplied through the rectifier 84 is accordingly of an intermediate value which shifts the axis 90 of grid potential wave $E_g$ sufficiently to maintain the effective conductivity of the speed control tubes 32 and 33 at a value which keeps the motor excitation at the desired-speed adjustment.

A decrease in the speed of regulated motor 10 similarly slows down pilot generator 60 and causes its voltage to lag behind that of master generator 62. As a result, there is set up in circuit 78 a circulating current which, as before assumed, is 180° out of phase with the voltage which serves to energize transformer 80. This produces in each of the corresponding current transformers 81 a voltage which in the supply circuit of rectifier 84, directly subtracts from that of voltage transformer 80 and thereby decreases the magnitude of axis-shifting potential $E_k$. This brings the grid potential axis 90 more nearly into coincidence with the power voltage wave axis 92, and thereby institutes conduction of tubes 32 and 33 at an earlier point during each of their positive half cycles of anode voltage. The resulting increased conductivity of the tubes acts to lower, in the system shown, the motor excitation and thus raises the speed of motor 10 back to the desired value.

Upon the occasion of an increase in motor speed, the pilot generator tends to similarly speed up so that its voltage leads in phase position the voltage of master generator 62. This sets up in circuit 78 a circulating current which in phase position coincides substantially with the voltage which energizes each of the transformers 80. This current produces in each of transformers 81 a voltage which upon being introduced into the supply circuit of the associated rectifier 84, directly adds to that of voltage transformer 80 and thereby increases the magnitude of axis shifting voltage $E_k$. As a result of the greater displacement of the grid voltage axis 90, the conduction starting point of the speed-control tubes 32 and 33 is delayed to a later point in each of the positive half cycles, so that the effective current passed by these tubes is correspondingly lowered. This lowered current serves to increase, in the system shown, the motor excitation and thus lowers the speed of motor 10 back to the desired value.

In order to improve the stability of the regulating means, anti-hunting means may, if found necessary, be combined therewith. As shown in association with motor 10, a preferred form of such means comprises a resistor 94 disposed in the supply circuit for axis-shifting potential $E_k$, which resistor is connected in series with a capacitor 96 for energization by the voltage appearing across a portion of a resistor 98 connected in series with one of the field windings of the regulating motor. In operation of this particular arrangement, which is comparable to that shown and described in a copending application, Serial No. 543,514 by J. H. Ashbaugh and F. H. Gulliksen, filed July 11, 1931, a change in the energizing current of the motor field winding 17, and hence the voltage appearing across resistor 98, causes the capacitor 96 to draw a current through resistor 94. The voltage drop set up in the resistor by this current is of such polarity that the excitation adjustment which produced it will tend to be retarded, such retardation resulting from a modification of the axis shifting voltage $E_k$. The magnitude of this modification furthermore is directly dependent upon the rate of change of motor excitation which is an exceedingly desirable characteristic in any stabilizing system.

The explanation of operation just given relative to regulating motor 10 also applies to motor 12, which, as before stated, is provided with duplicate speed control equipment, and to any additional motors which may be similarly controlled. By adjusting, through a change in the setting of the speed changing devices 74, the relative rates at which the master generators are driven, comparable adjustments in the relative speeds at which the several motors will be maintained may be effected. Hence, without changing the speed of the master driving shaft 72, the speeds of the several regulated machines may be varied relative to each other. When it is desired to raise or lower the speeds of all of the regulated motors in a similar manner or in the same proportion, this may be done by appropriately varying the speed of master generator driving motor 70.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. A speed-regulating system for a rotating machine comprising, in combination, a source of master alternating-current voltage of speed-setting frequency, a source of pilot voltage having a frequency proportional to the actual speed of the machine, a circuit for interconnecting said two sources, speed-adjusting means for the machine comprising an electronic tube, an alternating-current energizing circuit for the tube, a source of alternating-current control potential for said tube, means for producing a uni-directional potential which varies with the phase displacement between the voltages of said pilot and master sources, and means for causing said uni-directional potential to shift the axis of the wave of tube control potential with respect to that of tube energizing voltage to thereby adjust the tube conductivity.

2. A speed-regulating system for a rotating machine comprising, in combination, a source of master alternating-current voltage of speed-setting frequency, a source of pilot voltage having a frequency proportional to the actual speed of the machine, a circuit for interconnecting said two sources, speed-adjusting means for the machine comprising an electronic tube, an alternating-current energizing circuit associated with the tube, means for impressing upon the tube a wave of control voltage, a transformer energized by the current which flows in said voltage-source interconnecting circuit, a rectifier, a circuit for impressing upon said rectifier the sum of the output voltage of said transformer and the voltage appearing in said interconnecting circuit, and means for causing the output voltage of the rectifier to displace the axis of the wave of tube control voltage from that of the tube energizing voltage to thereby adjust the tube conductivity.

3. In a regulating system comprising a pair of alternating-current voltage sources and an interconnecting circuit therefor, quantity-adjusting means comprising an electronic tube, an alternating-current energizing circuit for the tube, and means for impressing upon the tube a wave of control voltage, the combination of means for producing a uni-directional potential which varies with the phase displacement between the voltages of said two sources, and means for causing said potential to shift the axis of the wave of the control voltage out of coincidence with that of the tube energizing voltage to thereby adjust the tube conductivity.

4. A regulating system comprising, in combination, a pair of alternating-current voltage sources and an interconnecting circuit therefor, quantity-adjusting means comprising an electronic tube, an alternating-current energizing circuit for the tube, means for impressing upon the tube a wave of control voltage, a transformer energized by the voltage appearing in said interconnecting circuit, a second transformer energized by the current in said circuit, a rectifier, means for impressing upon the rectifier the sum of the output voltages of said two transformers, and means for causing the output voltage of the rectifier to shift the axis of the wave of tube control voltage out of coincidence with that of the tube energizing voltage to thereby adjust the tube conductivity.

5. In a regulating system comprising a pair of alternating-current generators, a circuit for interconnecting said generators, means for causing deviations from a desired value in a regulated quantity to effect displacement between the voltages of said generators, and means for adjusting the magnitude of said quantity comprising an electronic tube, an alternating-current energizing circuit for the tube, and a source of control voltage for the tube, the combination of a transformer energized by the voltage of the generator interconnecting circuit, a second transformer energized by the current of said circuit, a rectifier, means for impressing the output voltages of said two transformers upon the rectifier, and means for causing the output voltage of the rectifier to shift the axis of the wave of tube control voltage out of coincidence with that of the tube energizing voltage to thereby adjust the tube conductivity.

6. In a speed regulating system for an electric motor having field and armature windings, said system comprising a source of master alternating-current voltage, a source of motor pilot voltage, a circuit for interconnecting said two sources, speed-adjusting means for the motor comprising an electronic tube, an alternating-current energizing circuit for the tube, and a source of control voltage for the tube, and means responsive to the current in said interconnecting circuit for producing a uni-directional potential which shifts the axis of the wave of tube control voltage out of coincidence with that of the tube energizing voltage, the combination of anti-hunting means comprising a resistor disposed to modify said unidirectional potential in accordance with the voltage appearing across it, a capacitor, a circuit including said capacitor, and means for energizing said circuit by a voltage proportional to the current acting in one of said motor windings.

STEPHEN A. STAEGE.